United States Patent
Malomsoky et al.

(10) Patent No.: US 7,929,512 B2
(45) Date of Patent: Apr. 19, 2011

(54) PERFORMANCE MANAGEMENT OF CELLULAR MOBILE PACKET DATA NETWORKS

(75) Inventors: Szabolcs Malomsoky, Szentendre (HU); Andras Veres, Budapest (HU); Istvan Szabo, Budapest (HU); Tamas Borsos, Budapest (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 987 days.

(21) Appl. No.: 10/595,246

(22) PCT Filed: Sep. 30, 2003

(86) PCT No.: PCT/SE03/01517
§ 371 (c)(1),
(2), (4) Date: Mar. 29, 2006

(87) PCT Pub. No.: WO2005/032186
PCT Pub. Date: Apr. 7, 2005

(65) Prior Publication Data
US 2007/0070969 A1    Mar. 29, 2007

(51) Int. Cl.
*H04J 3/00* (2006.01)
*H04W 24/00* (2009.01)
*H04W 72/00* (2009.01)

(52) U.S. Cl. ..... 370/345; 455/423; 455/425; 455/452.2; 455/453; 455/424

(58) Field of Classification Search .......... 455/423–425, 455/452.2, 453; 370/252, 237
See application file for complete search history.

(56) References Cited

U.S. PATENT DOCUMENTS

| 6,208,620 B1* | 3/2001 | Sen et al. ............... 370/231 |
| 7,177,641 B1* | 2/2007 | Miernik et al. ........... 455/435.1 |
| 7,280,803 B2* | 10/2007 | Nelson ............... 455/67.11 |
| 7,327,708 B2* | 2/2008 | Komandur et al. ........... 370/332 |
| 7,466,652 B2* | 12/2008 | Lau et al. ............... 370/230.1 |
| 2002/0044527 A1* | 4/2002 | Jiang et al. ............... 370/229 |

(Continued)

FOREIGN PATENT DOCUMENTS

EP    1335505 A1    8/2003

(Continued)

OTHER PUBLICATIONS

Soldani, D. et al.: "An Improved Method for Accessing Packet Data Transfer Performance Across a UMTS Network." The 5$^{th}$ International Symposium on Wireless Personal Multimedia Communications, Oct. 27, 2002, vol. 2, pp. 534-538; ISSN: 1347-6890.

(Continued)

*Primary Examiner* — George Eng
*Assistant Examiner* — Muthuswamy G Manoharan

(57) ABSTRACT

A method in a cellular mobile packet data network is provided composed of four main steps. These are capturing raw traffic traces over standardized interfaces of an operational cellular mobile data network, parsing through the traces in order to extract and correlate all the information, which is needed to build a traffic and session database, defining a set of appropriate key performance indicators, and calculating the above defined key performance indicators. A system in a mobile data network is also provided, the key element of which is a traffic and session database, which correlates traffic and mobility information extracted from passively captured traces collected from standardized interfaces. A set of key performance indicators describing the true, user perceived end-to-end quality of the most commonly used applications is also listed.

28 Claims, 7 Drawing Sheets

U.S. PATENT DOCUMENTS

| | | | |
|---|---|---|---|
| 2002/0048259 A1* | 4/2002 | Adam et al. | 370/230 |
| 2002/0194325 A1* | 12/2002 | Chmaytelli et al. | 709/224 |
| 2003/0055954 A1* | 3/2003 | Kavanagh | 709/224 |
| 2003/0134631 A1* | 7/2003 | Snyder et al. | 455/423 |
| 2003/0148755 A1* | 8/2003 | Bovo et al. | 455/414 |
| 2003/0186693 A1 | 10/2003 | Shafran et al. | |
| 2003/0237016 A1* | 12/2003 | Johnson et al. | 714/4 |
| 2004/0033806 A1* | 2/2004 | Daniel et al. | 455/450 |
| 2004/0243715 A1* | 12/2004 | Yokoyama | 709/231 |
| 2004/0248583 A1* | 12/2004 | Satt et al. | 455/452.2 |
| 2005/0058161 A1* | 3/2005 | Sorokopud et al. | 370/912 |

FOREIGN PATENT DOCUMENTS

| | | |
|---|---|---|
| WO | WO 03037018 | 5/2003 |
| WO | WO 03037018 A1 | 5/2003 |

OTHER PUBLICATIONS

Xiangguang, C et al: "GPRS radio network performance simulation and optimization with dynamic simulator" In: International Conference on Communication Technology Proceedings, 2003. ICCT 2003. Apr. 9-11, 2003, vol. 2, pp. 935-939, Inspec AN: 7824314, see sections I-III.

Soldani, D. et al: "An improved method for assessing packet data transfer performance across a UMTS network". In: The 5th International Symposium on Wireless Personal Multimedia Communmications, 2002. Oct. 27-30, 2002, vol. 2, pp. 534-538, ISSN: 1347-6890, Inspec AN: 7652452, see paragraphs 1 and 4-5.

* cited by examiner

PERFORMANCE MANAGEMENT OF CELLULAR MOBILE PACKET DATA NETWORKS

BACKGROUND OF THE INVENTION

1. Technical Field of the Invention

The invention relates to a performance management method and a system in a cellular mobile packet data network including but not limited to performance analysis, bottleneck analysis, system improvement and dimensioning.

2. Description of Related Art

The performance management of cellular mobile data networks such as General Packet Radio Service (GPRS), Universal Mobile Telecommunication Service (UMTS) and Code Division Multiple Access 2000 (CDMA2000), gets more and more important as the number of subscribers starts to pick up, the traffic on these networks increases and subscribers start to use more and more different applications and services. There is a need for performance management solutions, which makes it easy to find out when there is a performance problem in the network, but it has the same importance to find out the location of the performance problem. Such a performance management system should help the operator in the fields mentioned before, i.e. performance analysis indicates whether users get what they paid for or what they expect, bottleneck analysis presents what the bottlenecks are in the network, system improvement tries to enhance the system such that these problems get eliminated after identifying the causes of performance problems, and dimensioning shows which cells, links, etc need to be re-dimensioned, and how.

In case of a circuit switched service such as voice, it was basically enough to measure the call intensities, call durations and the ratio of blocked calls. In case of packet switched services e.g. Web, Wireless Application Protocol (WAP), File Transfer Protocol (FTP), e-mail, Multimedia Message Service (MMS), etc. the above tasks are not at all trivial, because the end-to-end (or user perceived) performance depends on the interaction of many protocols at different interfaces and on various protocol layers. Furthermore, the use of shared resources leads to rather complicated queuing phenomena, which are difficult to model and analyze.

In current GSM, GPRS, CDMA2000 and UMTS networks, the service area is divided into cells covering limited geographical areas. The aim of the mobile operator should be to provide a constant and ubiquitous high quality service regardless of the location of its subscribers. This is a very challenging task for example because subscribers tend to be distributed non-homogenously across the service area.

Solutions are known for passive measurement based characterization of Internet Protocol (IP) e.g. in "A Passive Method for Estimating End-to-End TCP Packet Loss", IEEE Globecom 2002, as well as GPRS networks determining user perceived quality using passive monitoring in packet switched systems. For example, in case of GPRS packets on the so-called Gi interface have been captured. The Gi interface connects the Gateway GPRS Support Node (GGSN) with external packet data networks e.g., an Internet Service Provider (ISP). Based on the Gi traffic traces detailed traffic and end-to-end performance analysis results has been delivered to operators. At the same measurement point where Gi traffic can be captured, the messages to/from the Remote Authentication Dial-In User Service (RADIUS) server can typically also be captured. The RADIUS packets can be used to reconstruct user sessions.

Performance counters for GSM/GPRS cells are known from the practice. E.g. Statistics and Traffic Measurement Subsystem (STS) in the Ericsson Base Station System (BSS) records some key radio network events. These counters provide information about the performance and traffic load in specific cells. The following list exemplifies what sort of information the operator can obtain from these counters:

The number of connections successfully established on the Traffic Channel (TCH).

For every cell there are counters for the number of allocation attempts. They are incremented at every attempt to allocate a TCH in a resource type in the cell, to be used for signalling, data or speech, regardless of whether the allocation succeeded or failed.

A counter shows the accumulated number of available (i.e. idle and busy) Basic Physical Channels used for traffic in a cell.

Number of Offered Incoming Calls.

Number of Offered Normal Originating Calls.

A counter is stepped each time the Base Station Controller (BSC) attempts to allocate a set of one or more Packet Data Channels (PDCHS) from the circuit switched domain.

Accumulated number of allocated PDCHS.

The peak number of active PDCHs from the last 15 minutes.

The total number of Radio Link Control (RLC) data blocks transmitted by the Packet Control Unit (PCU) during the measurement period.

The total number of RLC data blocks retransmitted by the PCU during the measurement period.

Accumulated number of Temporary Block Flows (TBFs) per traffic combination of Upload/Download (UL/DL).

Accumulated number of PDCHs carrying at least one TBF per traffic combination of UL/DL and GPRS/EGPRS, where EGPRS stands for Enhanced General Packet Radio Service.

Counters are collected every 5 or 15 minutes. This is the Basic Recording Period, which can be set by command and is recommended to be 15 minutes. Measurement data for the Basic Recording Period is accessible in the database for two hours.

There is a widespread knowledge about drive tests. In this set-up, special purpose terminals are used, which run a given application. A test user operates the terminal and it runs an application, which is under test.

In case of cellular mobile data networks, the terminal can for example be installed on the board of public transport service bus or a taxi. The application is run repeatedly, and the performance results together with the cell level location of the test are recorded. This way performance results are obtained for the cells, which have been visited during the drive test.

Early experiments quickly showed that in order to efficiently monitor and manage cellular mobile data networks, two type of information is necessary: User perceived end-to-end performance of different applications and information about the resource usage and performance in the different cells. The need for the first type of information is obvious, the reason for requiring this information on cell level is that cells are the basic dimensioning units of cellular data networks, congestion typically occurs because the resources of a particular cell are exhausted, and the performance problem can most often be alleviated by adding additional resources, e.g. a couple of new traffic channels to the problematic cell.

As mentioned before, advanced passive measurement based methods are available to characterize the user perceived end-to-end performance of different applications in case of GPRS networks, but these methods currently work on a whole network basis and it is not currently possible to obtain the key performance indicators on cell level. The problem with the monitoring systems developed for the Internet is that they miss an important abstraction level, which is key to a mobile operator, and that is the level of the mobile subscriber. IP addresses and IP application transactions need to be associated with the mobile subscriber they belong to, which cannot be done with a traditional IP network monitoring system.

There is a set of counters available in the BSS of company Ericsson to obtain performance results on cell level. It is clear from the above list that these counters can be used to understand the cell level performance of circuit switched services but they do not tell much about the user perceived end-to-end quality of service of packet switched applications and services. Other problem with the counters is that different system vendors might implement different counters, which makes it impossible to build a coherent performance monitoring system in a multi-vendor network. Furthermore, the maintenance of these counters puts a significant load on the BSC node. Therefore performance results are available only with a very coarse-grained time resolution. The most important problem with the third performance-monitoring alternative, the drive test is that it is not scalable. It generates additional load over the network and it requires significant time to cover a large area with enough measurements to allow obtaining statistically reliable measurement results, not to mention the difficulty of generating realistic application level traffic patterns in such an artificial use case.

Thus there is a particular need for a passive performance monitoring solution, which provides information about the true, user perceived end-to-end performance of mobile data networks; it provides this information on cell level; it is scalable; and it is vendor independent.

To build such a passive performance monitoring system for cellular data networks is not trivial because the information, which is necessary to be collected, cannot be obtained at a single measurement point.

SUMMARY OF THE INVENTION

The present invention provides a method in a cellular mobile packet data network composed of four main steps. These are capturing raw traffic traces over standardized interfaces of an operational cellular mobile data network; parsing through the traces in order to extract and correlate all the information, which is needed to build a traffic and session database. This database contains information about each and every user session and user transaction, which happened during the measurement period; defining a set of appropriate key performance indicators, which can be used to characterize the performance of cells in terms of user perceived quality of service parameters; and calculating the above defined key performance indicators by selecting an appropriate subset of the transactions in the traffic database, and calculating the key performance indicator value by summing/averaging the given Quality of Service (QoS) measure of the selected individual transactions.

It is particularly an object of the invention to set up a system in a mobile data network, the key element of which is a traffic and session database, which correlates traffic and mobility information extracted from passively captured traces collected from multiple standardized interfaces.

Accordingly, it is an object of the invention to enable efficient and detailed characterization and performance management of particular cells in a cellular mobile data network.

A set of key performance indicators, which describe the true, user perceived end-to-end quality of the most commonly used applications are also listed.

Another aspect of the invention is a computer program product for performance management in a cellular mobile packet data network performing the main steps of capturing raw traffic traces, building a traffic and session database, defining a set of appropriate key performance indicators and calculating the key performance indicators.

Such a method greatly improves the performance and service management of cellular mobile data networks, given that the operator can easily find out if the performance of a cell does not meet the user's expectations and can immediately act where the problem is.

BRIEF DESCRIPTION OF THE DRAWINGS

In the following, the essential features of the invention will be described firstly in general for any cellular mobile packet data network then in details by showing the diagrams and flowcharts of some preferred embodiments of GPRS network with reference to the figures of the attached drawings.

DETAILED DESCRIPTION OF THE INVENTION

The first main step is to look at the architecture of the cellular mobile packet data network which has a plurality of mobile stations linked to a plurality of base stations through a plurality of radio channels, where the base stations are linked to a radio access network, and the radio access network is linked to a support node in a packet core network. We also have to look at the protocol stacks over the standardized interfaces. The result of this investigation is a set of interfaces, which need to be captured in order to have all the information necessary for the traffic and session database available. All the IP packets of all (or at least a significant portion to ensure statistical reliability of the results) of the user transactions need to be captured together with the session and mobility management signaling of the users. If the above information needs to be captured at multiple interfaces, it is required to have at least one unambiguous identifier of the user present in all the traces. An additional requirement is to record a timestamp with each captured packet.

Figure 1:
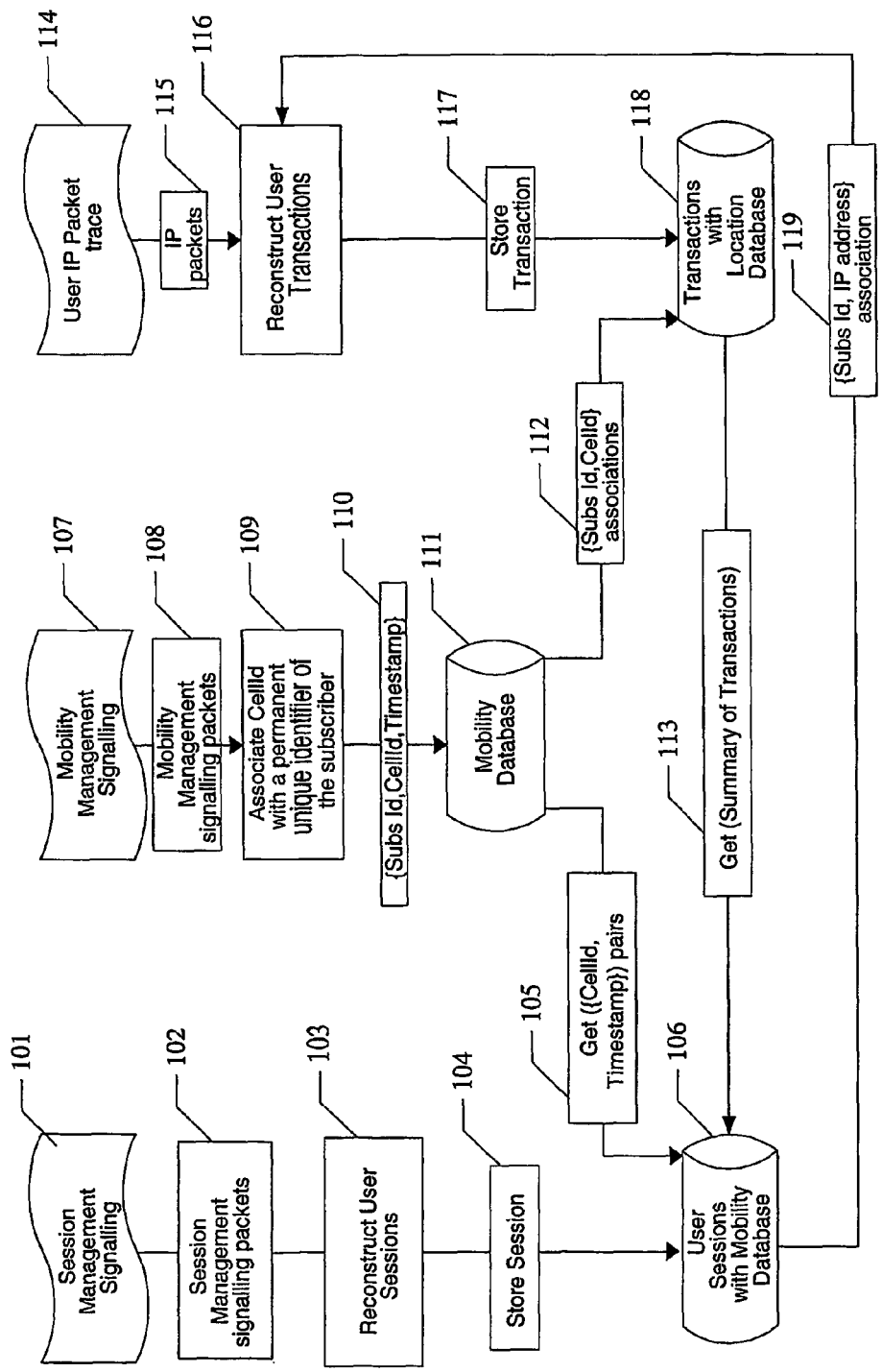
FIG. 1 is a flowchart showing the building of the traffic an session database in general.

The second main step is to parse through the traces and to build the traffic and session database. The process is depicted in FIG. 1. IP packets 115 from the captured traces 114 are processed one by one and the packets belonging to the same application transaction of the same user are grouped together in step 116. These groups can be created by looking at the <source IP address, destination IP address, source port, destination port> fields in the IP header and by looking up the {Subs Id, IP address} association 119 in the User Sessions with Mobility Database 106. Looking for the standard port numbers can identify applications, e.g.: Transmission Control Protocol (TCP) port 80 for Web traffic. Depending on the application logic, identified packet groups can be further divided into user transactions like TCP connections, Hypertext Transfer Protocol (HTTP) object downloads, WAP object downloads, and so on. After having all packets of a particular transaction collected, condensed information like the start, end, duration, amount of data in uplink and downlink, success, failure of the transaction is generated and the information is stored 117 in a Transaction with Location Database 118.

Further difficulty is to associate subscribers with the condensed application transactions information collected above. In mobile packet data networks there are signaling messages 101 to initiate a subscriber data session. In these signaling exchanges 102, a subscriber identifies itself by one of its unique identifier in the mobile system, for example its International Mobile Subscriber Identity (IMSI) and the system answers with an IP address, which the mobile can use for its application transactions. By parsing through these signaling messages in step 103, the required association between subscribers and their transactions can be established. The QoS parameters requested for the subscriber data session can also be extracted from the signaling messages.

The only missing link now is the association between the user transaction and its cell level location. In mobile data networks, typically when there is an active user data session and typically at interfaces in the radio access network of the system, there is signaling 107 when the mobile changes cell. In these signaling messages 108 an identifier of the subscriber is sent together with its new cell level location 112. The identifier is sometimes temporary but unique. If the identifier in these signaling exchanges is temporary, then the signaling exchange in which the subscriber identified with a permanent unique identifier gets its temporary unique identifier needs also to be interpreted in step 109. This results in a database 111 containing the permanently unique identifier of the subscriber together with cells it visited, and the timestamp when the visit happened 110. Using this data, the condensed transaction information 118 is extended in step 112 with the cell level location of the transaction and an indicator of cell change during the course of the transaction. Finally, summary data 113, i.e. type and number of transactions, total number of uplink and downlink traffic, QoS profile, are generated about the transactions belonging into the same user session, and it is stored 104 together with the list of cells visited during the session and the timestamp of the visits resulting in a User Session with Mobility Database 106.

The third main step is defining the Key Performance Indicators (KPIs). The following KPIs are used to characterize the performance of a cell in mobile packet data networks:

MMS Large Message Download/Send Rate in a Specified Cell

Given in bit/sec, these KPIs define the average transmission rate during sending or downloading of large MMS messages. Only successful transactions are considered whose size is larger than a given amount of bytes. Recommended value is 5 kbytes. The rate is calculated as the total IP-layer transmitted/received bytes divided by the total duration of the transaction. A size limit is included to eliminate transient effects of short messages.

WAP Object Download Delay in a Specified Cell

The average delay between the request packet from the mobile until the server response is successfully acknowledged by the mobile. Precondition: successfully finished download.

Web Small Object Download Time (9-11 kbyte) in a Specified Cell

The average time it takes to download a small HTTP object. Only small (9-11 kbytes) files are measured. Due to the TCP protocol, small objects are not able to utilize the full capacity available in the cell. The download time of such small objects depends more on the round-trip time. To have comparable results between different measurements and cells, only objects that fall into a narrow range are measured. The chosen range of 9-11 kbytes was chosen because the median of Web downloads falls in this range. Condition: object download was successful.

Web Large Object Download Rate (Larger than 50 kbyte) in a Specified Cell

The average rate is the size of the object divided by the time it takes to successfully download the object. This measure is also called goodput. Only large objects are measured, when the available end-to-end path capacity dominates the measure and not the object size. Condition: object download was successful.

FTP Download Rate (Larger than 50 kbyte in a Specified Cell)

The average rate is the size of the downloaded file divided by the time it takes to download it. Only large files are measured, when the available end-to-end path capacity dominates the measure and not the file size. Condition: file download was successful.

POP3, Mail Download Time (9-11 kbyte) in a Specified Cell

This KPI defines the average time to successfully download one or more e-mails from the Post Office Protocol 3 (POP3) e-mail server. The whole time is measured including server greeting, authentication, and time to download of all mails and quit. Condition: mail download was successful, and the total downloaded amount of bytes is small (between 9-11 kbytes).

POP3, Mail Download Rate (Larger than 50 kbyte) in a Specified Cell

This KPI defines the average rate during successful download of one or more e-mails from the POP3 e-mail server. The rate is measured during the whole time including server greeting, authentication, and time to download of all mails and quit. Condition: mail download was successful, and more than 50 kbytes was downloaded.

End-to-End Achievable Throughput in a Specified Cell

This KPI measures the achievable IP layer throughput end-to-end. This KPI is measured by tracing those mobiles that generate one or more parallel TCP downloads saturating the downlink channel. In an optimally configured network this KPI shows the available data transfer capacity in the cell. The KPI is calculated as follows: The total inbound traffic of the user (including other transactions) between the first data packet of the particular TCP connection and the acknowledgement of the last data packet of the particular TCP connection. The above bytecount is divided by the time elapsed between the first and last inbound data packet.

Rate of TCP Connections, Stalled Periods in a Specified Cell

This KPI gives the average rate achieved by greedy TCP flows, as well as the frequency of stalled periods within them.

User-Perceived Throughput History in a Specified Cell

This KPI gives the throughput limitation users perceive as a function of time. It can be used for Service Level Agreement validation. It is based on the throughput of greedy user session segments. Optionally, the variance and quantities can also be given.

In addition to these values, it is necessary to determine the share of different traffic types in the cells. This means calculating the accumulated traffic of the following protocols: TCP, User Datagram Protocol (UDP), Internet Control Message Protocol (ICMP), HTTP, FTP, WAP, Simple Mail Transfer Protocol (SMTP), Domain Name System (DNS), POP3, Interactive Mail Access Protocol 4 (IMAP4), and Telnet.

By using the information captured in step building the traffic database, additional key performance indicators can be defined.

The fourth main step is calculating the Key Performance Indicators. The procedure for calculating the above listed key performance indicators is as follows:
(1) Read the next transaction record from the traffic database.
(2) Check whether this transaction is of the type, which the KPI is about. This can be done using the flow type field of the transaction record.
(3) Check whether the transaction happened in the cell specified for the KPI. This can be done using the Cell Id field of the transaction record.
(4) Calculate the quantity defined by the KPI for the particular transaction. Information elements used are: duration, timestamp of the first data packet, timestamp of the last data packet, packet count and loss count fields of the transaction record.
(5) Add the value to an aggregation counter, and increase the counter calculating the number of eligible transactions for the KPI.
(6) Go back to the beginning until all the transactions are processed.
(7) Calculate the KPI value by dividing the value of the aggregation counter with count of the eligible transactions.

In the following, some preferred embodiments will be described in GPRS networks.

Figure 2:
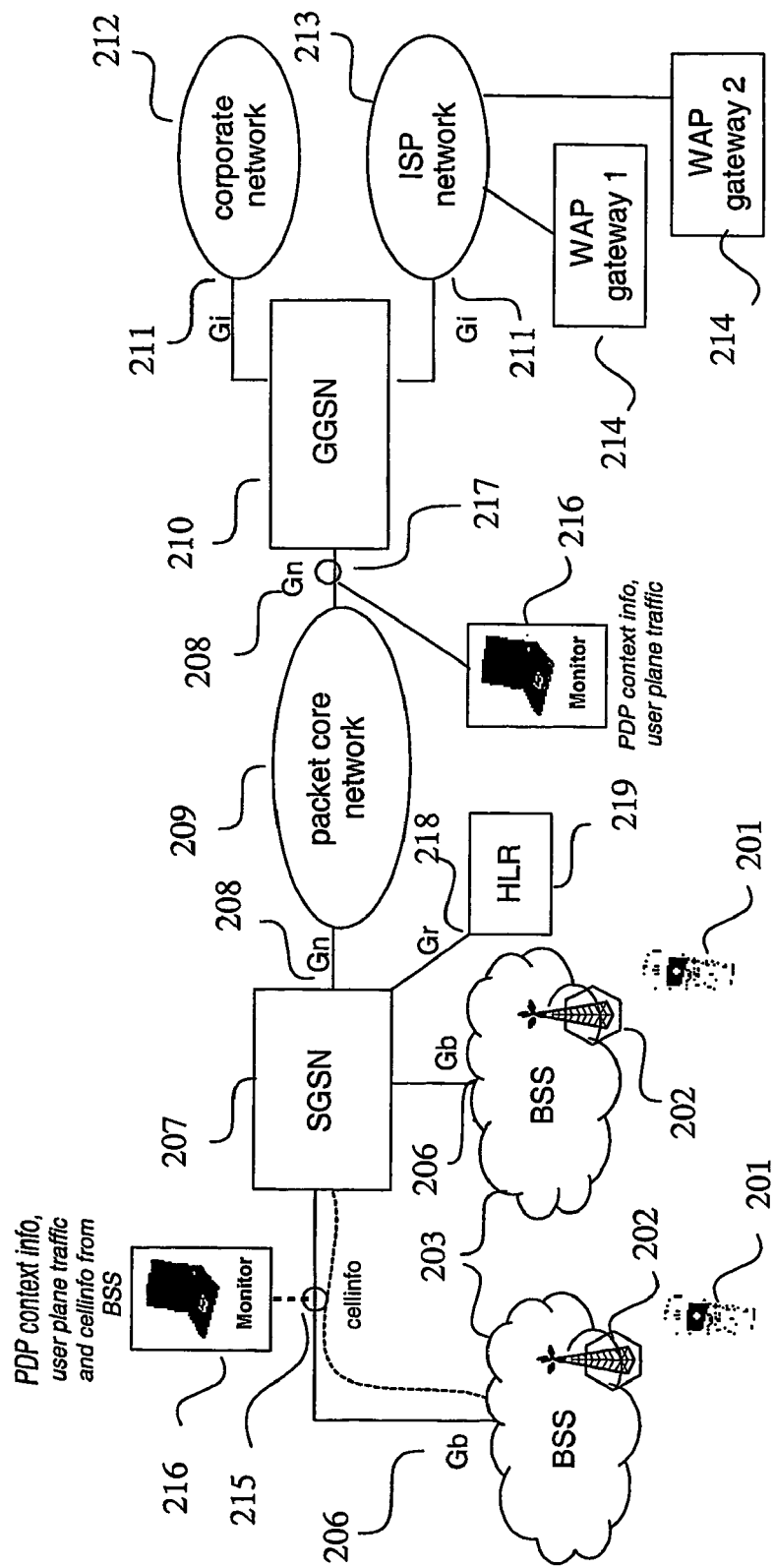
FIG. 2 is a diagram of an exemplary architecture of a GPRS cellular mobile packet data network.

In the specific case of GPRS networks, shown in FIG. 2, mobile stations 201 communicate with base stations 202 through radio channels. The base stations 202 are grouped to Base Station Subsystems (BSSs) 203, which are connected to a SGSN 207. The SGSN 207 is linked to a packet core network 209 and to a GGSN 210. The GGSN 210 is linked to a corporate network 212 and to an ISP network 213. Additionally, two WAP Gateways 214 are connected to the ISP network 213. Measurement points 215, 217 are attached to monitors 216 thereby accessing session and traffic information from the network. The session management information in GPRS network is communicated between the mobile stations 201 and the core network 209 (i.e., the GPRS network containing the SGSNs and GGSNs). Depending on the configuration of the particular network, simultaneously captured traffic traces are needed for the method to operate from one or more of the interfaces listed below. Processing details in case of different trace combinations can be seen later in description of building the database.

Gb interface 206, which interconnects the BSS 203 with the Serving GPRS Support Node (SGSN) 207, carries GPRS Mobility Management and GPRS Session Management signaling together with the data packets of the users. It is a Frame Relay interface, but many protocol analyzers (Nettest, Radcom, Nethawk, Tektronix) are available on the market to capture all traffic from one or more Gb interfaces 206 into a dump file.

Gn interface 208 interconnects the GPRS Support Nodes i.e. the SGSNs 207 and GGSNs 210. It carries GPRS Session Management signaling together with user data packets. Both data and signaling packets are transported over GPRS Tunneling Protocol (GTP). This interface is typically a standard IP (Ethernet) interface so freeware tools like TCPDump can be used to capture traffic from the Gn interface 208 into a dump file.

Gi interface 211 interconnects the GGSN 210 of the GPRS network with an external IP network, e.g. with corporate network 212 or ISP network 213. This interface is typically a standard IP (Ethernet) interface so freeware tools like TCPDump can be used to capture traffic from the Gi interface 211 into a dump file. In order to be able to track Packet Data Protocol (PDP) sessions on the Gi interface 211, RADIUS messages are also need to be captured in addition to the user data packets.

Gr interface 218 interconnects the SGSN 207 with the Home Location Register (HLR) 219. Many protocol analyzers (Nettest, Radcom, Nethawk, Tektronix) are available on the market to capture traffic from Gr interfaces 218 into a dump file.

Figure 3:
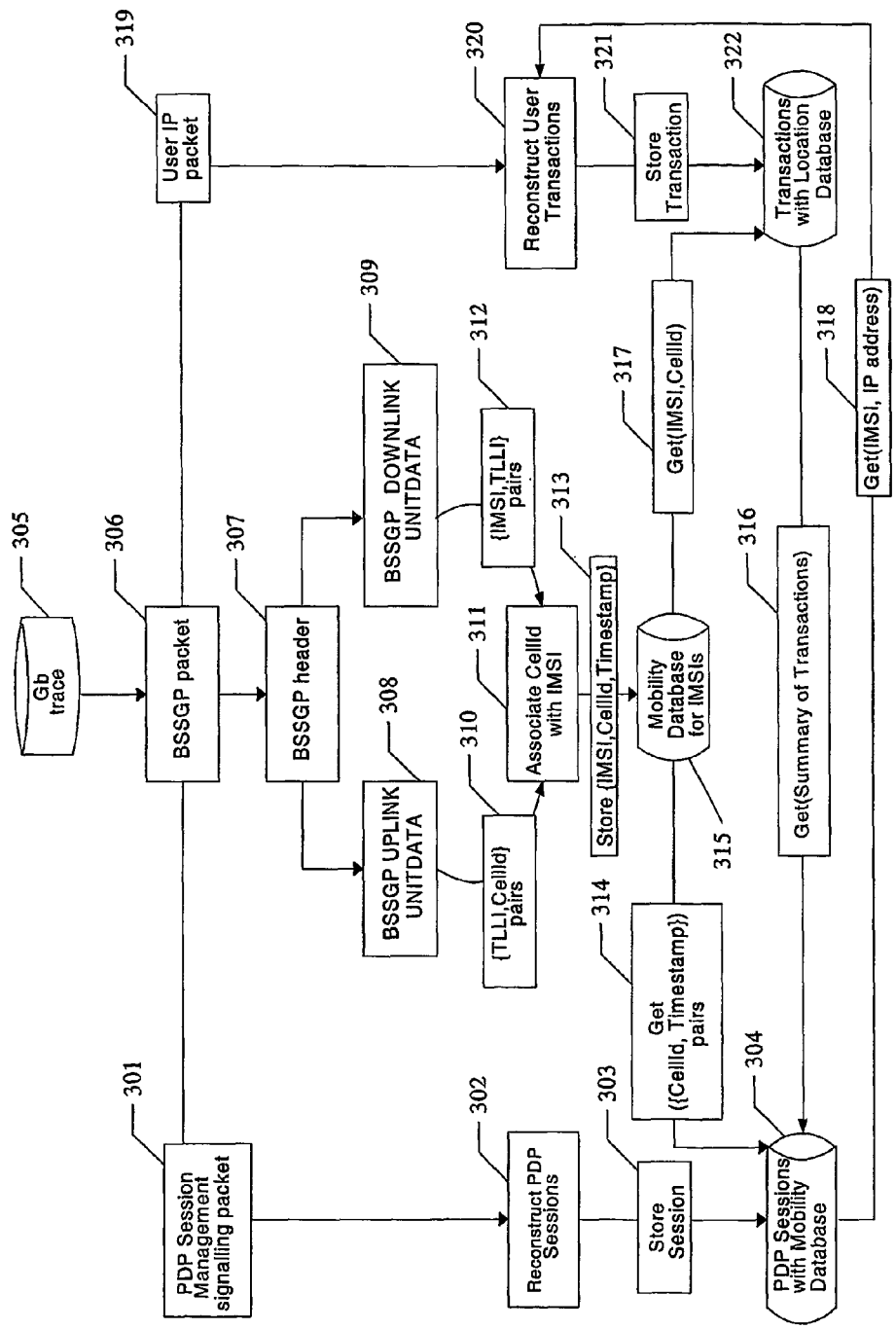
FIG. 3 is a flowchart illustrating the building of the GPRS traffic an session database from a Gb trace.

FIG. 3 illustrates the building of the GPRS Traffic Database from a Gb Trace 305 showing the relationship between the different information elements available in the Gb trace 305, the required processing steps and the resulting databases The following information can be extracted from protocol data units captured over the Gb interface [General Packet Radio Service (GPRS); BSS-Serving GPRS Support Node (SGSN);BSS GPRS Protocol (BSSGP) (GSM.08.18 version 8.9.0 Release 1999)]

Cell ID of each and every active user: BSS GPRS Protocol (BSSGP) 306 UPLINK-UNITDATA 308 Protocol Data Unit (PDU) transfers a Mobile Station (MS)'s Logical Link Control (LLC)-PDU and its associated radio interface information across the Gb interface. Part of this PDU is the Cell ID.

GPRS Multi Slot Class: The purpose of the Mobile Station Classmark 4 information element (IE) is to provide the network with information concerning aspects of the mobile station related to GPRS. Among many other things this IE contains data about the GPRS Multi Slot Class. Mobile Station Classmark 4 IE is present in "Attach Request" messages. Another information element MS Radio Access Capability also contains the GPRS multiclass information. This information element is present in BSSGP DOWNLINK-UNITDATA 309.

BSSGP DOWNLINK UNITDATA 308 PDU contains IMSI and MS Radio Access Capability, together with the Temporary Logical Link Identity (TLLI), and the old TLLI whenever TLLI changes. BSSGP UPLINK UNITDATA 308 PDU carries the TLLI and the Cell ID 310. The following algorithm 311 can be used to extract the mobility data:
(1) Whenever a DOWNLINK UNITDATA 309 PDU is encountered in the trace, check whether it contains a new IMSI 312.
If a new IMSI is encountered register it, together with the corresponding TLLI and timestamp.
If an already known IMSI is encountered, check whether TLLI change is indicated.
If TLLI change is indicated, register the new TLLI as belonging to the old IMSI.
(2) Whenever a BSSGP UPLINK UNITDATA 308 PDU is encountered in the trace, look up the IMSI database mentioned above to find out the IMSI which the TLLI belongs to 310.
(3) Check whether the Cell ID is identical to the last one registered to the IMSI in the database.
If a new Cell ID is found, register it in step 313 to the IMSI together with the timestamp of the BSSGP PDU in the Mobility Database for IMSIs 315.

Whenever an IP packet carrying user data is found in the BSSGP packet, it is used for reconstructing the user transactions in step 320. A transaction is coherent traffic between two endpoints, identified by IP address and ports (only for TCP and UDP). The delimitation of transactions is protocol-specific, for example, it is a connection in case of TCP, it is a request/response pair in case of a DNS query. Whenever packets of a new transaction are collected from the packet stream, a new record is created 321 in the Transactions with Location Database 322 containing the following information:

- The timestamp of transaction start;
- Flow type, Inner and outer addresses in step 318; Inner and outer ports;
- Protocol number;
- Numeric identifier of the user session in step 318;
- Transaction duration in seconds from start to last activity;
- Number of packets in and out; Number of bytes in and out;
- IP layer rates in both directions (bits per second);
- Protocol-dependent statistics.
- IMSI of the user in step 318;
- Cell Id at the start of the transaction in step 317,
- Flag whether the user has changed cell during the transaction
- MS Class of the terminal;

Parallel with above described processing of the BSSGP header 307 and user IP packets 319, the PDP session management signaling 301 contained in the BSSGP packets is also processed. Based on the "Create PDP Context Request", "Create PDP Context Response" signaling messages and the condensed transaction records, PDP session records are created in step 302 which store in step 303 in the PDP Session with Mobility Database 304 the following information about the new PDP session:

- Starting timestamp; addresses and port numbers;
- Numeric identifier referenced from the user transactions database;
- Duration; Number of transactions involved;
- Number of packets and bytes transmitted for both directions;
- Number of transactions on different network and application protocols in step 316.
- IMSI of the user
- IP address allocated for the session
- QoS profile
- List of {CellId, Timestamp} pairs tracking the mobility of the user during the session in step 314.

Figure 4:
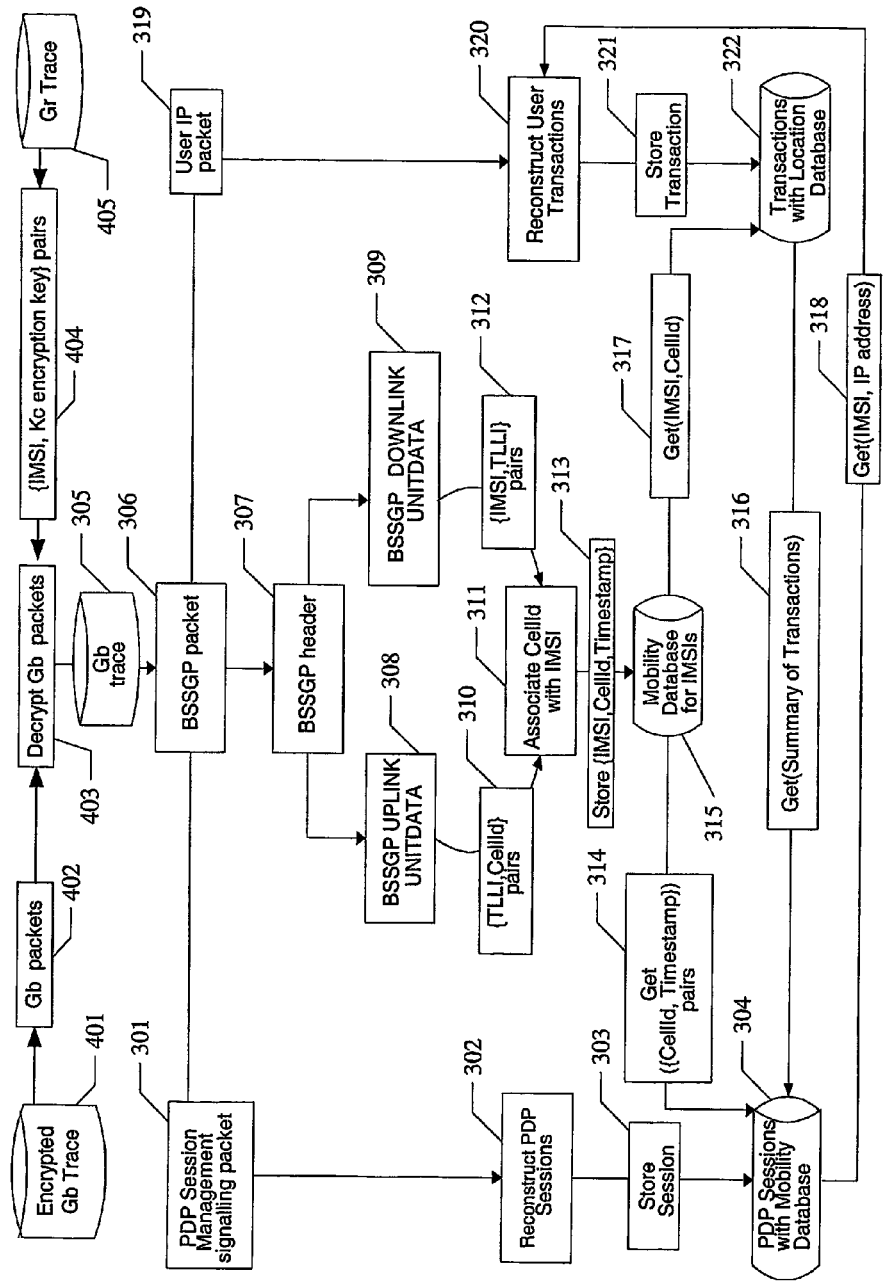
FIG. 4 is a flowchart depicting the building of the GPRS traffic and session database from an encrypted Gb and a Gr trace.

In FIG. 4 the process of building the GPRS traffic database from an encrypted Gb 401 and a Gr trace 405 is outlined. Operators often encrypt their Gb interface, which hide the data and session management signalling above the LLC protocol layer. The solution in this case is to capture simultaneous trace over the Gr interface, look up the user specific Kc encryption key 404 in the Gr trace 405 and use the standardised encryption algorithms to decrypt 403 the Gb packets 402 [Digital cellular telecommunications system (Phase 2+); Security related network functions (GSM 03.20 version 8.0.0 Release 1999)]. After decryption, the process is identical to the one described in FIG. 3.

Figure 5:
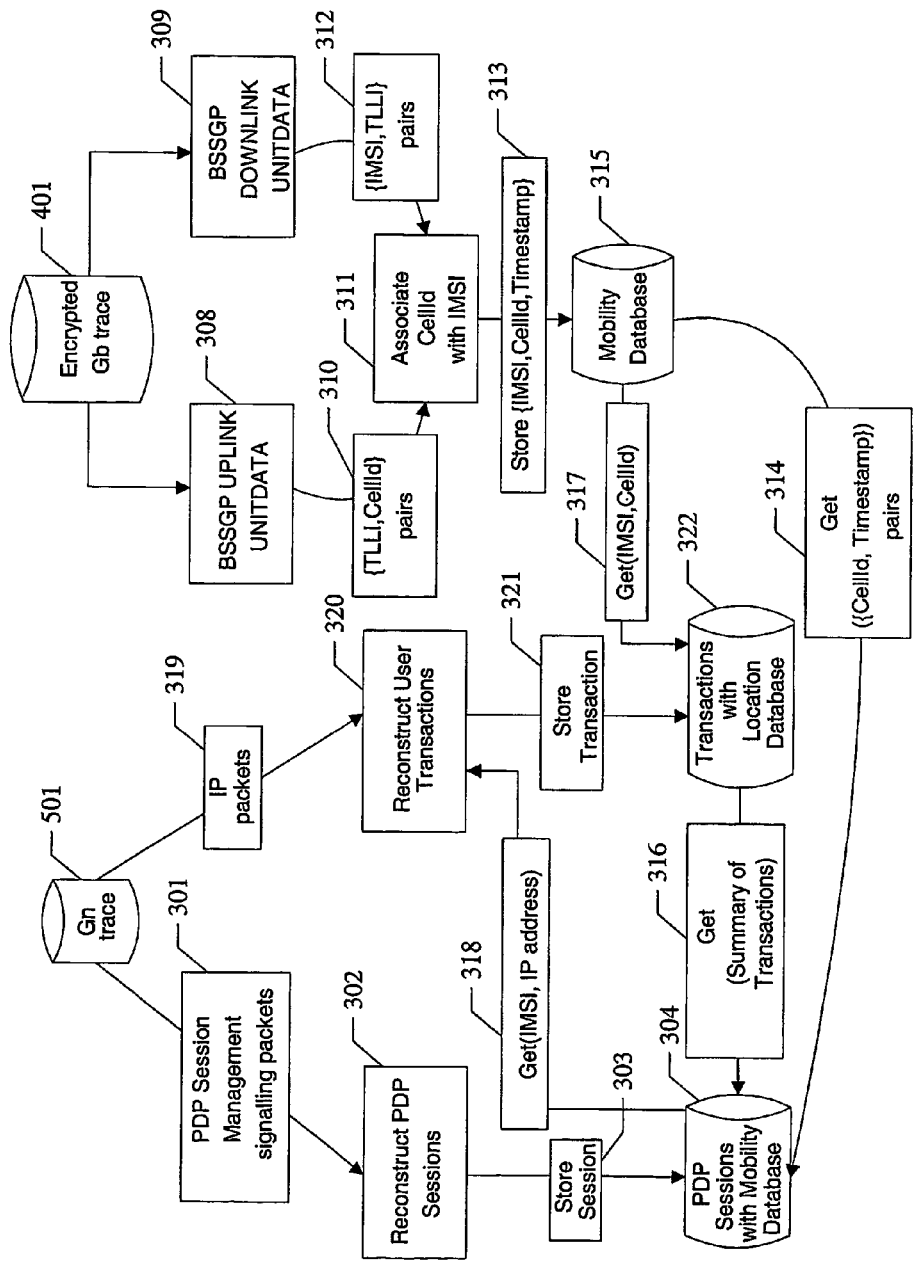
FIG. 5 is a flowchart showing the building of the traffic and session database from an encrypted Gb and Gn trace.

FIG. 5 depicts the process of building the traffic database from an encrypted Gb 401 and a Gn trace 501. If the Gb trace is encrypted, it is encrypted at the LLC layer. This means that mobility management information can still be obtained from the BSSGP protocol header. The PDP session control signalling messages are present in the Gn trace 501 together with all the user data packets. IP packets 319 of the user data are extracted from the GTP tunneling packets, and not from the BSSGP UNITDATA packets.

Figure 6:
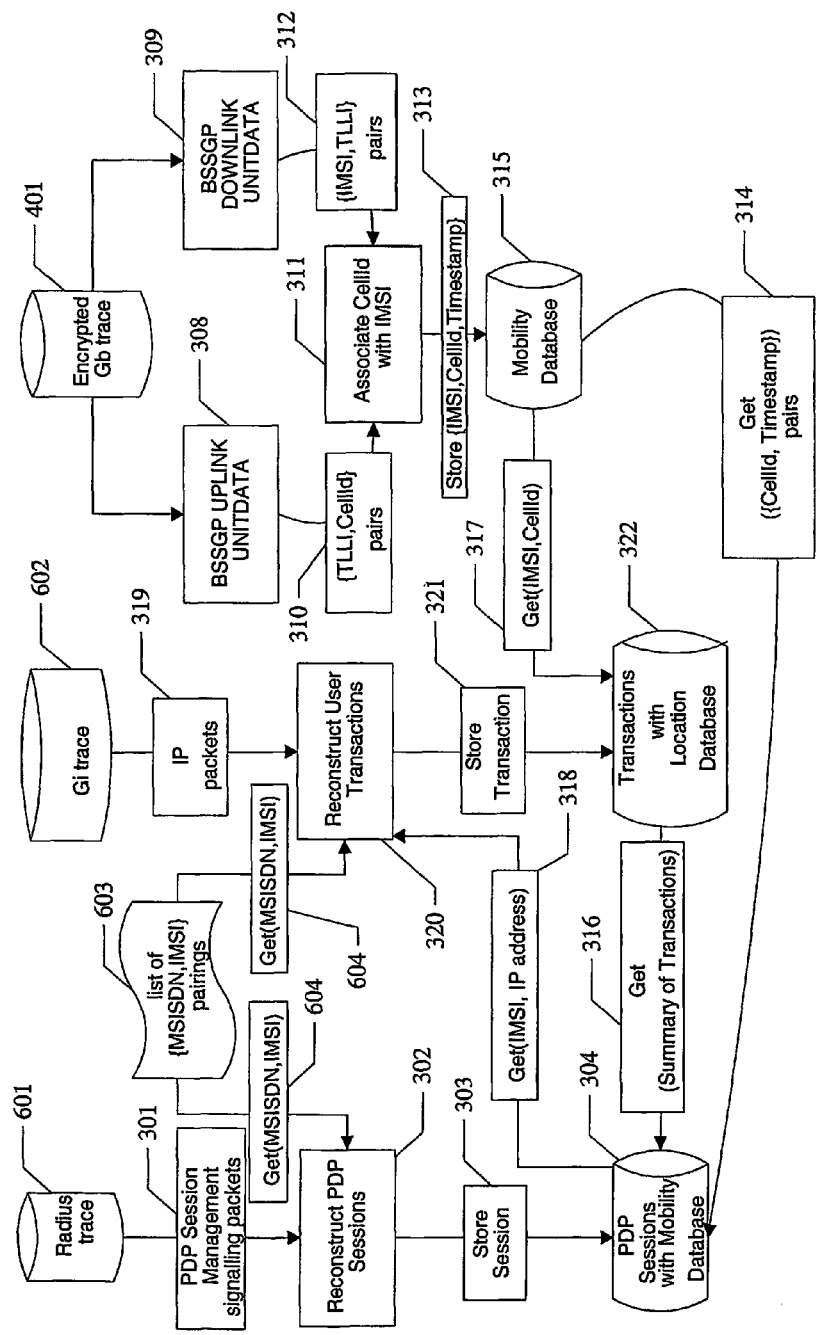
FIG. 6 is a flowchart illustrating the building of the traffic and session database from an encrypted Gb, a Gi, a RADIUS trace and an {MSISDN, IMSI} list.

FIG. 6 illustrates the process of building the traffic database from an encrypted Gb trace401, a Gi trace 602, a RADIUS trace 601 and an {MSISDN, IMSI} list 603. It is possible to use Gi traces 602 provided that the Gi trace is amended with the RADIUS packets [General Packet Radio Service (GPRS); Interworking between the Public Land Mobile Network (PLMN) supporting GPRS and Packet Data Networks (PDN) (3GPP TS 09.61 Version 7.10.0 Release 1998)](No optional IMSI in RADIUS packets!), and there is a database containing the list of {IMSI, MSISDN} pairings 603 for the users. A RADIUS request will indicate the start of a PDP session and trigger the construction of a new session record. The user will be identified in the RADIUS packets by an MSISDN. To be able to associate the mobility pattern found in the Gb trace with the user sessions and transactions the corresponding IMSI needs to be looked up 604 in the {IMSI, MSISDN} database.

A similar process of building the traffic database from an encrypted Gb, a Gi and RADIUS trace can be carried out according to the figure when the {MSISDN, IMSI} list is missed but the vendor specific parameter IMSI is present in the RADIUS messages. A RADIUS request will indicate the start of a PDP session and trigger the construction of a new session record. The user will be identified in the RADIUS packets by the IMSI therefore the mobility pattern found in the Gb trace can be associated with the user sessions and transactions found in the Gi/RADIUS trace.

Figure 7:
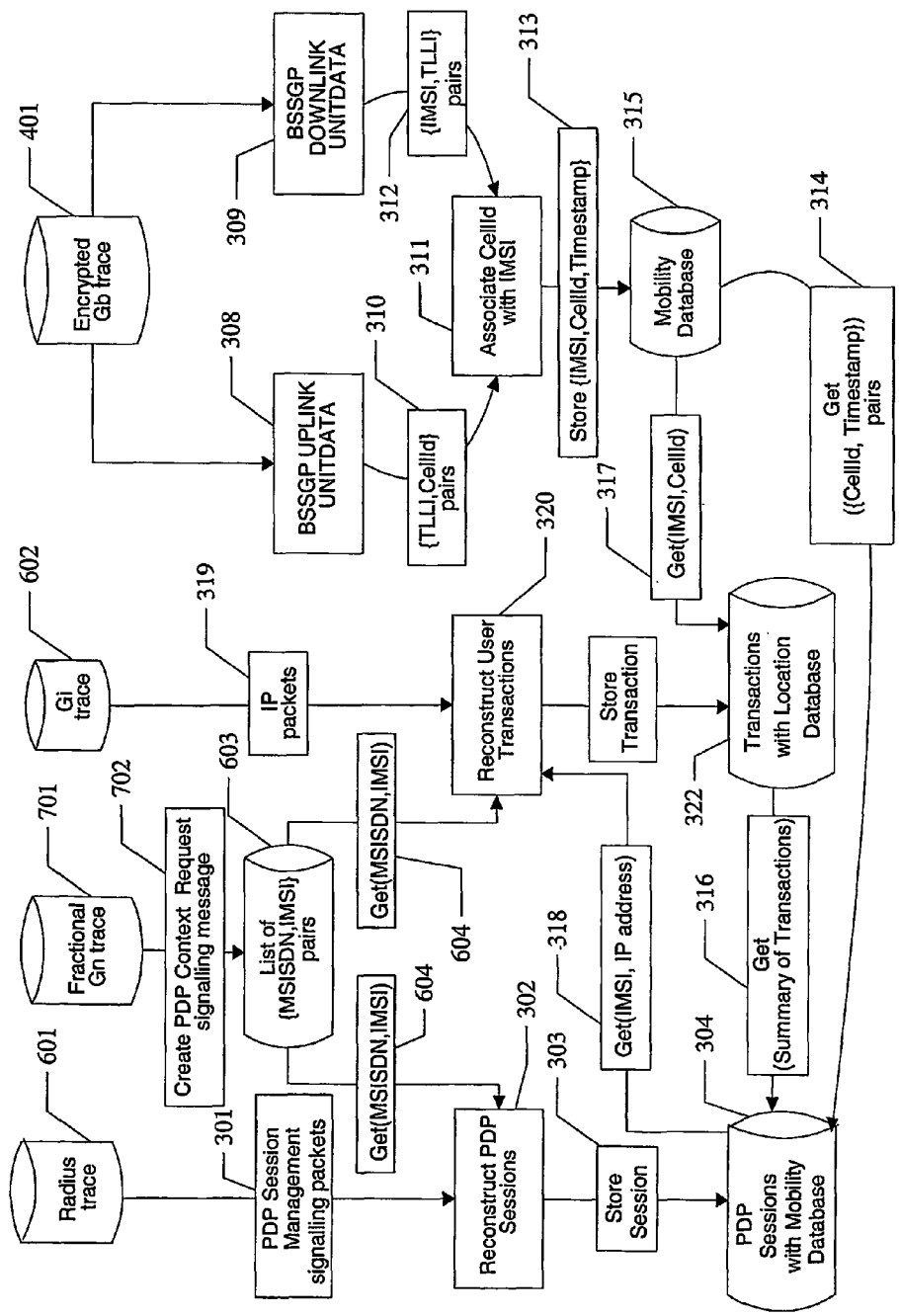
FIG. 7 is a flowchart depicting the building of the traffic and session database from an encrypted Gb, a Gi, a RADIUS trace and a fractional Gn trace.

FIG. 7 shows the process of building the traffic database from an encrypted Gb trace 401, a Gi trace 602, a RADIUS trace 601 and a fractional Gn trace 701. If there is any sort of Gn trace available, not necessarily simultaneous with the Gb and Gi trace, but covering the same network segment, it can be used to automatically build a large enough database of {IMSI, MSISDN} pairs:

If GTP version used over the Gn interface is v0, the IMSI is contained in every message header as part of the Tunnel ID field, while the MSISDN is present as a mandatory parameter in "Create PDP Context Request" messages in step 702.

If GTP version used over the Gn interface is v1, both the IMSI and the MSISDN is contained as a conditional parameter in "Create PDP Context Request" messages in step 702. Using this list of {IMSI, MSISDN} pairs 603, the procedure of the previous section can be applied.

The key performance indicators listed before are suitable for the specific case of GPRS networks. The process described before can be used for calculating the key performance indicators from the GPRS traffic databases.

The method for passive measurement based characterization of mobile packet data networks makes possible for the operator to obtain key performance indicators to describe the user perceived end-to-end performance of different applications, and the measurement results are associated with specific cells. The method therefore not just indicates a performance problem but also pinpoints the location of the problem. It uses raw measurement data available from standardized network interfaces, which has two important advantages: it is vendor independent and easy to obtain enough measurement data to calculate results with statistical significance.

Cellular mobile packet data operators when trying to increase the revenue they obtain from packet switched services face a significant challenge. They need to attract business users to cash in a big amount of money, but business users require a robust, reliable service, which offers quality of service guarantees. One way to overcome this problem is to define a service level agreement, which outlines what sort of guarantees the subscriber can expect from the network. For such an agreement to be convincing for the potential customers, it shall be written in terms of the user perceived performance indicators. The monitoring method described in this invention is a tool for the operator to offer such new, value added services, because it gives a cheap, easy to implement way of monitoring and tracking the guarantees put forward in such a service level agreement.

Further advantage of the method is that it does not rely on a particular trace when constructing the traffic database but it is capable of obtaining and correlating the required information from a set of different trace combinations of standardized Gb, Gi, Gn, and Gr GPRS interfaces. This makes the method applicable for most of GPRS networks which are run today regardless of their salient configuration settings.

Although only preferred embodiments of GPRS network have been illustrated in the accompanying Drawings and described in the foregoing Detailed Description, it is understood that the invention is not limited to the embodiments disclosed, but is capable of arrangements, modifications, and substitutions of other mobile data networks without departing from the spirit of the invention as set forth and defined by the following claims.

What is claimed is:

1. A method for performance management in a cellular mobile packet data network having a plurality of mobile stations linked to a plurality of base stations through a plurality of radio channels, the base stations being linked to a radio access network, and the radio access network being linked to a support node in a packet core network comprising the steps of:

capturing raw traffic traces over standardized interfaces of the operational cellular mobile data network;

building a traffic and session database by parsing through the traces in order to extract and correlate information about a plurality of user transactions which happened during a measurement period, wherein each user transaction is associated with a specific subscriber using captured session management signaling, and each user transaction is associated with a cell location using captured mobility management signaling, said building the traffic and session database comprises the steps of:

parsing through the raw traffic traces for internet protocol (IP) packets;

processing the IP packets one by one to group together the IP packets belonging to a same user transaction of a same user;

storing condensed application transactions information associated with the IP packet groups;

associating subscribers with the stored condensed application transactions information by:

parsing through signaling message used to initiate subscriber data sessions where the subscribers identify themselves by using unique identifiers and the cellular mobile data network answers with IP addresses which the mobile stations use for the user transactions;

associating the user transactions with cell level locations by:

monitoring mobility management signaling when the mobile stations change cells to obtain identifiers of the subscribers and the cell level locations;

storing the identifiers of the subscribers together with the cell level locations and timestamps when the subscribers visited the cells;

extending the stored condensed application transactions information to include the cell level locations of the user transactions and indicators of cell changes during a course of the user transactions; and storing summary data about the users transactions belonging to same user sessions together with a list of cells visited during the user sessions and the timestamps when the subscribers visited the cells;

defining a set of key performance indicators; and calculating the set of key performance indicators using a subset of the information in the traffic and session database to monitor user perceived end-to-end performance on a cell level.

2. The method of claim 1, wherein the cellular mobile packet data network is a GPRS network.

3. The method of claim 2, wherein the step of capturing raw traffic traces over standardized interfaces of the operational cellular mobile data network relates to a Gb trace.

4. The method of claim 2, wherein the step of capturing raw traffic traces over standardized interfaces of the operational cellular mobile data network relates to an encrypted Gb and Gr trace.

5. The method of claim 2, wherein the step of capturing raw traffic traces over standardized interfaces of the operational cellular mobile data network relates to an encrypted Gb and a Gn trace.

6. The method of claim 2, wherein the step of capturing raw traffic traces over standardized interfaces of the operational cellular mobile data network relates to a Gb, a Gi and a Remote Authentication Dial-in User Service (RADIUS) trace.

7. The method of claim 2, wherein the step of capturing raw traffic traces over standardized interfaces of the operational cellular mobile data network relates to an encrypted Gb, Gi, RADIUS trace and a list of Mobile Station ISDN (MSISDN) and International Mobile Subscriber Identity (IMSI) numbers.

8. The method of claim 2, wherein the step of capturing raw traffic traces over standardized interfaces of the operational cellular mobile data network relates to an encrypted Gb, Gi, RADIUS trace and a fractional Gn trace.

9. The method of claim 1, wherein the step of defining a set of key performance indicators comprises a key performance indicator measuring MMS large message download/send rate in a specified cell.

10. The method of claim 1, wherein the step of defining a set of key performance indicators comprises a key performance indicator measuring WAP object download delay in a specified cell.

11. The method of claim 1, wherein the step of defining a set of key performance indicators comprises a key performance indicator measuring Web small object download time in a specified cell, where the size of a small object is 9-11 kbyte.

12. The method of claim 1, wherein the step of defining a set of key performance indicators comprises a key performance indicator measuring Web large object download rate in a specified cell, where the size of a large object is larger than 50 kbyte.

13. The method of claim 1, wherein the step of defining a set of key performance indicators comprises a key performance indicator measuring FTP download rate in a specified cell, where the size of the downloaded file is larger than 50 kbyte.

14. The method of claim 1, wherein the step of defining a set of key performance indicators comprises a key performance indicator measuring POP3, mail download time in a specified cell, where the size of the downloaded file is 9-II kbyte.

15. The method of claim 1, wherein the step of defining a set of key performance indicators comprises a key performance indicator measuring POP3, mail download rate in a specified cell, where the size of a downloaded file is larger than 50 kbyte.

16. The method of claim 1, wherein the step of defining a set of key performance indicators comprises a key performance indicator measuring end-to-end achievable throughput in a specified cell.

17. The method of claim 1, wherein the calculation of key performance indicator measuring end-to-end achievable throughput in a specified cell comprises the steps of:
   calculating total inbound traffic of the user, including other transactions, between the first data packet of the particular TCP connection and the acknowledgement of the last data packet of the particular TCP connection;
   dividing the total inbound traffic (byte count) by the time elapsed between the first and last inbound data packet.

18. The method of claim 1, wherein the step of defining a set of key performance indicators comprises a key performance indicator measuring the rate of TCP connections and stalled periods in a specified cell.

19. The method of claim 1, wherein the step of defining a set of key performance indicators comprises a key performance indicator measuring the user-perceived throughput history in a specified cell.

20. The method of claim 1, wherein the step of calculating the set of performance indicators is carried out by calculating the key performance indicator value by summing the given Quality of Service measure of the selected individual transactions.

21. The method of claim 1, wherein the step of calculating the set of performance indicators is carried out by calculating the key performance indicator value by averaging the given Quality of Service measure of the selected individual transactions.

22. The method of claim 1, wherein the step of calculating the set of performance indicators contains the steps of
   reading the next transaction record from the traffic and, session database;
   checking whether this transaction is of the type, which the KPI is about;
   checking whether the transaction happened in the cell specified for the KPI;
   calculating the quantity defined by the KPI for the particular transaction;
   adding the value to an aggregation counter, and increasing the counter calculating the number of eligible transactions for the KPI;
   returning to the beginning until all the transactions are processed;
   calculating the KPI value by dividing the value of the aggregation counter with count of the eligible transactions.

23. The method of claim 22, wherein the step of checking whether this transaction is of the type, which the KPI is about is carried out by using the flow type field of the transaction record.

24. The method of claim 22, wherein the step of checking whether the transaction happened in the cell specified for the KPI is carried out by using the Cell Id field of the transaction record.

25. The method of claim 22, wherein the step of calculating the quantity defined by the KPI for the particular transaction uses the information elements of duration, timestamp of the first data packet, timestamp of the last data packet, packet count and loss count fields of the transaction record.

26. A system for performance management in a cellular mobile packet data network having a plurality of mobile stations linked to a plurality of base stations through a plurality of radio channels, the base stations being linked to a radio access network, and the radio access network being linked to a support node in a packet core network, the system including a monitor node residing on a computer coupled to the cellular mobile packet data network comprising:
   means for capturing raw traffic traces over standardized interfaces of the operational cellular mobile data network;
   means for building a traffic and session database by parsing through the traces in order to extract and correlate information about a plurality of user transactions which happened during a measurement period, wherein each user transaction is associated with a specific subscriber using captured session management signaling, and each user transaction is associated with a cell location using captured mobility management signaling, said means for building the traffic and session database comprises:
      means for parsing through the raw traffic traces for internet protocol (IP) packets;
      means for processing the IP packets one by one to group together the IP packets belonging to a same user transaction of a same user;
      means for storing condensed application transactions information associated with the IP packet groups;
      means for associating subscribers with the stored condensed application transactions information, said means for associating subscribers comprises:
         means for parsing through signaling message used to initiate subscriber data sessions where the subscribers identify themselves by using unique identifiers and the cellular mobile data network answers with IP addresses which the mobile stations use for the user transactions;
      means for associating the user transactions with cell level locations, said means for associating the user transactions comprises:
         means for monitoring mobility management signaling when the mobile stations change cells to obtain identifiers of the subscribers and the cell level locations;
         means for storing the identifiers of the subscribers together with the cell level locations and timestamps when the subscribers visited the cells;
         means for extending the stored condensed application transactions information to include the cell level locations of the user transactions and indicators of cell changes during a course of the user transactions; and
      means for storing summary data about the users transactions belonging to same user sessions together with a list of cells visited during the user sessions and the timestamps when the subscribers visited the cells;
   means for defining a set of key performance indicators; and
   means for calculating the set of key performance indicators using a subset of the information in the traffic and session database to monitor user perceived end-to-end performance on a cell level.

27. The system of claim 26, in which the monitor node comprising a traffic and session database which correlates traffic and mobility information extracted from passively captured traces collected from standardized interfaces.

28. A computer program product embodied in a non-transitory computer readable storage medium, for performance management in a cellular mobile packet data network including a monitor node, said computer program product comprising:
- computer-readable program code for capturing raw traffic traces over standardized interfaces of the operational cellular mobile data network;
- computer-readable program code for building a traffic and session database by parsing through the traces in order to extract and correlate information about a plurality of user transactions which happened during a measurement period, wherein each user transaction is associated with a specific subscriber using captured session management signaling, and each user transaction is associated with a cell location using captured mobility management signaling, said computer-readable program code for building the traffic and session database comprises:
  - computer-readable program code for parsing through the raw traffic traces for internet protocol (IP) packets;
  - computer-readable program code for processing the IP packets one by one to group together the IP packets belonging to a same user transaction of a same user;
  - computer-readable program code for storing condensed application transactions information associated with the IP packet groups;
- computer-readable program code for associating subscribers with the stored condensed application transactions information, said computer-readable program code for associating subscribers comprises:
  - computer-readable program code for parsing through signaling message used to initiate subscriber data sessions where the subscribers identify themselves by using unique identifiers and the cellular mobile data network answers with IP addresses which the mobile stations use for the user transactions;
- computer-readable program code for associating the user transactions with cell level locations, said computer-readable program code for associating the user transactions comprises:
  - computer-readable program code for monitoring mobility management signaling when the mobile stations change cells to obtain identifiers of the subscribers and the cell level locations;
  - computer-readable program code for storing the identifiers of the subscribers together with the cell level locations and timestamps when the subscribers visited the cells;
  - computer-readable program code for extending the stored condensed application transactions information to include the cell level locations of the user transactions and indicators of cell changes during a course of the user transactions; and
- computer-readable program code for storing summary data about the users transactions belonging to same user sessions together with a list of cells visited during the user sessions and the timestamps when the subscribers visited the cells;
- computer-readable program code for defining a set of key performance indicators; and
- computer-readable program code for calculating the set of key performance indicators using a subset of the information in the traffic and session database to monitor user perceived end-to-end performance on a cell level.

* * * * *